Nov. 22, 1966  A. J. COOPER  3,286,350
DOWEL AND CLIP ASSEMBLY AND ITS USE IN
THE MANUFACTURE OF DENTAL RESTORATIONS
Filed Aug. 26, 1963
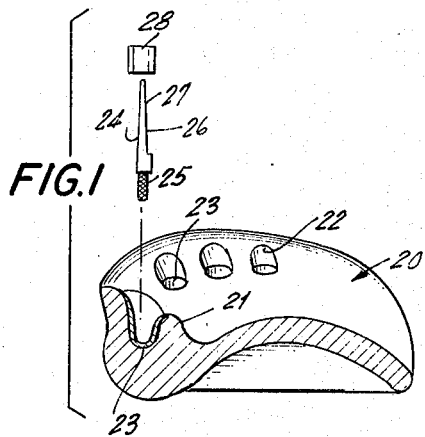
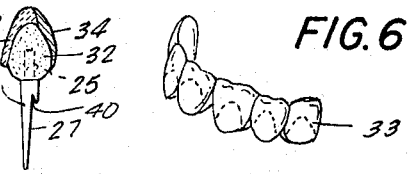
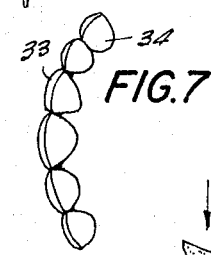
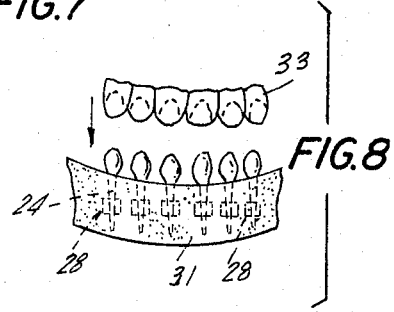
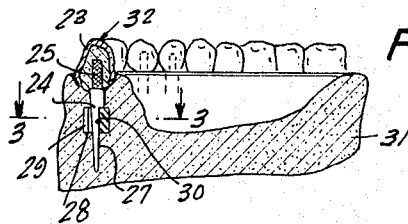
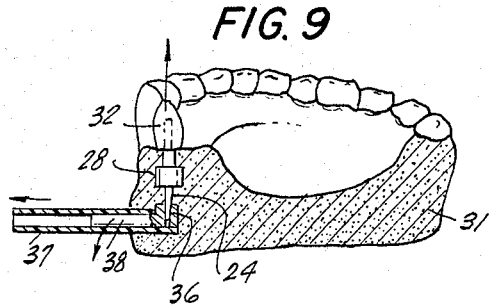
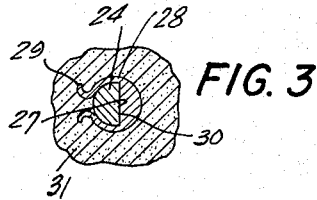
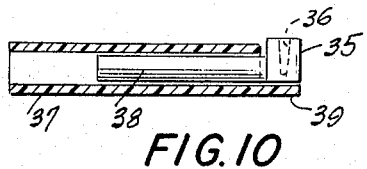
INVENTOR.
ABRAHAM J. COOPER
BY
ATTORNEY

United States Patent Office 3,286,350
Patented Nov. 22, 1966

3,286,350
DOWEL AND CLIP ASSEMBLY AND ITS
USE IN THE MANUFACTURE OF DENTAL
RESTORATIONS
Abraham J. Cooper, 1 De Kalb Ave., Brooklyn, N.Y.
Filed Aug. 26, 1963, Ser. No. 304,389
11 Claims. (Cl. 32—40)

This invention relates to the manufacture of dental restorations and particularly to the fabrication of crowns, caps, bridges and the like.

In the manufacture of certain dental restorations an impression is made in wax, rubber or other suitable material of the patient's teeth and gums. A quantity of casting material is poured into the impression to produce a simulation of the patient's teeth and gums known as a "model" or "mold." Dowels or pins are embedded in the model for each tooth and the casting material poured around them. Thereafter individual teeth in the form of dies and their supporting dowels are carefully cut away and removed from the casting. The individual tooth castings or dies serve as supports around which the artificial teeth, caps or crowns are built. In the course of completing the restoration it is necessary to remove and replace the dies and dowels many times from the model.

The above procedure is highly unsatisfactory for several reasons. In removing the dies from the model much time and careful work is required to prevent destruction of the model. When the dies are returned to the model it is difficult to keep them in their original alignment. Repeated insertion and removal of the dowels enlarges the holes in the model into which they fit, further contributing to the poor alignment of the teeth dies and causing the dies to fall out as they are being worked upon.

Accordingly, it is an object of the present invention to provide an assembly which will eliminate the shortcomings of prior art devices in the manufacture of dental restorations.

An object of the present invention is to provide a means for manufacturing dental restorations in less time and with consequent reduction in cost.

An object of the present invention is to provide an assembly which will assure the proper alignment of dental restorations upon completion.

A feature of the present invention is its use of a combined dowel and clip for removably holding the individual tooth die within the mold or model.

A feature of the present invention is the spring-like structure of the clip whereby its engagement with the dowel may be adjusted.

A feature of the present invention is its use of easily removable cores to facilitate the withdrawal of individual dies and dowels from the molds or models.

The invention consists of the construction, combination and arrangement of parts and the steps of the method, as herein illustrated, described and claimed.

In the accompanying drawings, forming a part hereof are illustrated two forms of embodiment of the invention in which drawings, similar reference characters designate corresponding parts, and in which:

FIGURE 1 is a somewhat exploded view partly in section of a dental impression and the dowel and anchoring spring clip used in the practice of the present invention.

FIGURE 2 is a cross-sectional view of a die and model made from the impression shown in FIGURE 1.

FIGURE 3 is a cross-sectional view taken on line 3—3 in FIGURE 2 looking in the direction of the arrows.

FIGURE 4 is a somewhat exploded fragmentary view partly in cross-section showing the manner in which an individual tooth die is removed from the remainder of the model.

FIGURE 5 is a cross-sectional view somewhat enlarged of a tooth die and restoration made in accordance with the present invention, showing a modified dowel structure.

FIGURE 6 is a somewhat isometric view of a dental restoration built upon the model made in accordance with the present invention.

FIGURE 7 is a top plan view of the restoration shown in FIGURE 6.

FIGURE 8 is a view in front elevation of a portion of the model with the dental restoration removed therefrom.

FIGURE 9 is a cross-sectional view of a model made in accordance with the present invention showing a novel core assembly for easy removal of individual tooth dies.

FIGURE 10 is a view partly in longitudinal section somewhat enlarged of the removable core portion shown in FIGURE 9.

Referring to the drawings and particularly to FIGURE 1, 20 indicates a wax or rubber impression which has been taken of the patient's teeth and gums. The impression 20 has gum conforming surfaces 21 and a plurality of sockets 22 which are the result of the impressions made by the patient's teeth in the soft material. The impression 20 is copper-plated or silver-plated in the interior of the sockets 22 to provide a very thin lining of metal as indicated at 23.

Following the plating steps acrylic or hard plaster known as "stone" is poured into the sockets 22 and, while the acrylic or stone is hardening a dowel 24 is inserted into the center of each of the sockets 22 for a hereinafter more fully disclosed purpose.

The dowels 24 as shown in FIGURE 1 are provided at one end with a small cylindrical knurled portion 25 which is embedded in the cast material. The balance of the dowel is elongated and pointed as shown at 26. The elongated portion 26 is substantially conical but is provided with a flat 27 thereon.

The acrylic or stone with the dowels set therein is allowed to harden. Thereafter, oil or grease is applied to the dowels and to all of the areas of the cast material adjacent the filled portion of the sockets 22. A small spring clip 28 (best shown in FIGURES 1 and 3) is next slipped over the elongated conical portion 27 of the dowels 24. The spring clip 28 consists of a band of metal bent back upon itself into a generally circular configuration and having outwardly extending flange portions 29 on the free ends thereof. A substantially flat bearing portion 30 is provided within the clip 28 against which the flat 27 of the dowel 24 is positioned. The upper end of the flat acts as a stop as it butts against the top of the spring clip. The center of the clip band may be thickened to provide the bearing portion. The tension of the clip 28 upon the dowel 24 may be initially regulated by forcing the flanged portions 29 together or apart at the time that the spring clip 28 is slipped over the dowel 24.

With the spring clip 28 in place on each of the dowels an additional quantity of acrylic or stone is poured over the remainer of the wax or rubber impression 20 and allowed to harden.

Since the copper or silver plate on the inside of the impression will stick to the acrylic or stone the cast material may next be separated from the impression 20 with the metal adhered to the individual tooth castings. When the cast material is separated from the impression 20 the result will be a model assembly such as is shown in FIGURE 2. This model acts as a form or support upon which the dental restoration is built. The model corresponds to the teeth and gums of the patient in every way with respect to the shape and angular disposition of the patient's teeth.

Since the dies or portion of the model representing the teeth were oiled or greased before the remainder of the acrylic or stone was poured into the impression, it is possible by a careful operation to extract individual teeth from the balance of the model. The dowels 24 can be pulled out of their engagement with the clips 28 and the individual tooth die and dowel as shown in FIGURE 5, used for the purpose for fitting dental restorations such caps, crowns, bridges or the like thereon. After individual restorations have been manufactured and during the course of this manufacture the die and dowel can be reinserted and removed from the model 31 with ease. Since the spring clip 28 remains within the model 31 it provides a rigid socket to receive the dowel 24. The flattened bearing portion 30 on the clip 28 also insures the proper orientation of the tooth die 32 whenever it is placed within the model 31. The top of the clip 28 acts as a stop for the dowel.

Where a series of caps are made for a patient's teeth as illustrated in FIGURES 5, 6, 7 and 8, it is important that the teeth dies 32 remain in the same orientation throughout the dental restoration manufacture and that this orientation be identical to that of the patient's teeth for fitting purposes. Each of the caps 33 are manufactured upon their individual die 32 and then replaced within the model 31. Thereafter, all of the caps 33 may be held together by means of metal 34 secured to the backs thereof in the well known manner. The completed dental restoration may then be removed from the support of the teeth die 32 and slipped over the teeth of the patient with a high degree of accuracy of fit.

While the use of oil or grease will generally permit the tooth die 32 and its dowel 24 to be removed from the model 31, difficulty is sometimes noted by a dowel or tooth sticking within the model 31. Accordingly, the assembly shown in FIGURES 9 and 10, has been provided to facilitate the initial subsequent removal of teeth dies and dowels from the model 31.

In carrying out this portion of the invention the model is proceeded with in the manner hereinabove described to a point where dowels have been inserted within the individual sockets 22 which have been filled with casting materials. Following the oil or greasing operation a spring clip 28 is slipped over each of the dowels 24 as previously set forth. A small pipe-shaped member 35 hereinafter referred to as a core is then placed upon the ends of each of the dowels 24 by slipping the end of the dowels into a bore 36 provided in the core for this purpose. The cores 35 are directed outwardly of the wax or rubber impression 20 so that they may be withdrawn from the model 31 as hereinafter more fully set forth. A sleeve 37 which is preferably made of polyethylene or some other suitable material to which the material of the model will not adhere is slipped over the elongated stem portion 38 of the core 35. The sleeve 37 has an elongated end portion 39 which slips beneath the inner end of the core 35 as shown in FIGURES 9 and 10. The end portion 39 being of substantial thickness provides a clearance below the core 35 when the sleeve 37 is slipped off the elongated stem 38 of the core 35.

With the cores 35 in place the balance of the model material is poured into the impression in the manner hereinabove described. After the model material has hardened the sleeves 37 are pulled out of the model 31 leaving the cores 35, attached to the ends of the dowels 24. The space left by the sleeves 37 provides sufficient clearance for the cores to be slipped downwardly and out of engagement with the ends of the dowels 24. In addition, a tool may then be slipped into the openings left by the core 35 and the dowel forced upwardly to free the dowel 24 and the tooth die 32 from the remainder of the model 31. In this manner a large amount of time which is spent in cutting away individual dies in order to free them from the model may be saved.

In FIGURE 5 the dowel 24 is shown with an undercut portion 40 at the end of the flat 27. The undercut portion 40 engages the edge of the clip which is formed to receive it. This construction provides a positive bearing surface for the dowel which causes it to assume the same position within the model each time it is replaced.

From the foregoing it will be seen that there has been provided a device and method for manufacturing dental restorations which lends itself to substantial savings in time and a vast improvement in the accuracy of such work. Since the position of the dowels 24 is determined and maintained by the imbedding of the spring clip member 28 the original alignment of the teeth dies 32 is maintained throughout the operation of manufacturing the restorations. The teeth dies are unable to twist or slant from their original position even though they are removed and replaced within the model 31 repeatedly. Even though the patient's teeth are irregular in their alignment, as is often the case, this irregularity will be matched by the adjustability or seating of the dowels in the dies and the restorations will be made accordingly.

Having thus fully described the invention what is claimed as new and desired to be secured by Letters Patent of the United States, is:

1. A dowel and clip assembly for supporting and positioning within a model, artificial teeth dies prepared in the manufacture of dental restorations comprising an elongated dowel member of substantially conical shape, an elongated flattened portion on the dowel, a tooth die receiving portion on the thick end of the dowel, a spring-like clip member receiving the conical portion of the dowel, and a flattened bearing surface within the clip to support and position the flattened portion of the dowel.

2. A dowel and clip assembly for supporting and positioning within a model, artificial teeth dies prepared in the manufacture of dental restorations comprising an elongated dowel member of substantially conical shape, an elongated flattened portion on the dowel, a tooth die receiving portion on the thick end of the dowel, a spring-like clip member receiving the conical portion of the dowel comprising a band of metal doubled back upon itself to form a somewhat circular configuration, outwardly extending flange portions on the free ends of the clip, and a flattened bearing surface within the clip to support and position the flattened portion of the dowel.

3. A dowel and clip assembly for supporting and positioning within a model, artificial teeth dies prepared in the manufacture of dental restorations comprising an elongated dowel member of substantially conical shape, an elongated flattened portion on the dowel, a cast cylindrical, knurled die receiving portion on the thick end of the dowel, a spring-like clip member receiving the conical portion of the dowel comprising a band of metal doubled back upon itself to form a somewhat circular configuration, outwardly extending flange portions on the free ends of the clip, and a flattened bearing surface within the clip to support and position the flattened portion of the dowel.

4. A dowel and clip assembly for supporting and positioning within a model, artificial teeth dies prepared in the manufacture of dental restorations comprising an elongated dowel member of substantially conical shape, an elongated flattened portion on the dowel, a tooth die receiving portion on the thick end of the dowel, a spring-like clip member receiving the conical portion of the dowel, and a flattened bearing surface within the clip to support and position the flattened portion of the dowel, and a pipe-shaped core assembly comprising an upstanding portion receiving the small end of the dowel, an outwardly extending stem portion secured thereto and a sleeve upon the stem portion and extending beneath the upstanding portion of the core.

5. A device according to claim 4 in which the sleeve is made of a material to which the casting will not adhere.

6. A dowel and clip assembly for supporting and positioning within a model, artificial teeth dies prepared in the manufacture of dental restorations comprising an elongated dowel member of substantially conical shape, an elongated flattened portion on the dowel, a cast cylindrical, knurled tooth die receiving portion on the thick end of the dowel, a spring-like clip member receiving the conical portion of the dowel comprising a band of metal doubled back upon itself to form a somewhat circular configuration, outwardly extending flange portions on the free ends of the clip, and a flattened bearing surface within the clip to support and position the flattened portion of the dowel, and a pipe-shaped core assembly comprising an upstanding portion receiving the small end of the dowel, an outwardly extending stem portion secured thereto and a sleeve upon the stem portion and extending beneath the upstanding portion of the core.

7. The method of forming removable tooth die elements within a model prepared from a dental impression having tooth corresponding sockets therein comprising, filling the tooth sockets with casting material, placing a dowel member in each of the sockets filled with casting material with a portion of the dowels extending therefrom, allowing the casting material to harden, slipping a dowel retaining clip over each of the extending portions of the dowels, placing an outwardly extending core member over the free ends of each of the dowels, covering the dowels, clips and a portion of the cores with additional casting material, allowing the cast material to harden, withdrawing the cores from the cast material and thereafter loosening the dowels and the cast teeth dies secured thereto from the embedded clips and remainder of the model.

8. The method of forming removable tooth die elements within a model prepared from a dental impression having tooth corresponding sockets therein comprising plating the inside surfaces of the sockets with metal, filling the tooth sockets with casting material, placing a dowel member in each of the sockets filled with casting material with a portion of the dowels extending therefrom, applying lubricant to all of the exposed portions of the dowels and the upper surfaces of the cast material, allowing the casting material to harden, slipping a dowel retaining clip over each of the extending portions of the dowels, placing an outwardly extending core member over the free ends of each of the dowels, covering the dowels, clips and a portion of the cores with additional casting material, allowing the cast material to harden, withdrawing the cores from the cast material and thereafter loosening the dowels and the teeth dies secured thereto from the embedded clips and remainder of the model.

9. The method of forming removable tooth die elements within a model prepared from a dental impression having tooth corresponding sockets therein comprising, filling the tooth sockets with casting material, placing a dowel member in each of the sockets filled with casting material with a portion of the dowels extending therefrom, allowing the casting material to harden, slipping a dowel retaining clip over each of the extending portions of the dowels, placing an outwardly extending core member over the free ends of each of the dowels, slipping a sleeve-like member over the outwardly extending portion of each of the cores, covering the dowels, clips and a portion of the cores and sleeves with additional casting material, allowing the cast material to harden, withdrawing the sleeves and then the cores from the cast material and thereafter loosening the dowels and the teeth dies secured thereto from the embedded clips and remainder of the model.

10. An assembly according to claim 1 in which the elongated flattened portion of the dowel terminates in a horizontal bearing surface and the clip is formed to receive the horizontal bearing in the abutting relationship.

11. An assembly according to claim 10 in which the horizontal bearing surface is undercut at the inner portion thereof.

References Cited by the Examiner
UNITED STATES PATENTS

| | | | |
|---|---|---|---|
| 1,822,043 | 9/1931 | Kohler | 32—71 |
| 2,851,728 | 9/1958 | Spalten et al. | 264—17 |
| 3,153,283 | 10/1964 | Weissman | 32—40 |
| 3,226,827 | 1/1966 | Spalten | 32—11 |

RICHARD A. GAUDET, *Primary Examiner.*

ROBERT E. MORGAN, *Examiner.*